US006976095B1

(12) United States Patent
Wolrich et al.

(10) Patent No.: US 6,976,095 B1
(45) Date of Patent: Dec. 13, 2005

(54) PORT BLOCKING TECHNIQUE FOR MAINTAINING RECEIVE PACKET ORDERING FOR A MULTIPLE ETHERNET PORT SWITCH

(75) Inventors: Gilbert Wolrich, Framingham, MA (US); Debra Bernstein, Sudbury, MA (US); Matthew J. Adiletta, Worc, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/476,303

(22) Filed: Dec. 30, 1999

(51) Int. Cl.[7] .............................................. G06F 15/16
(52) U.S. Cl. ...................... 709/250; 718/102; 718/107
(58) Field of Search ................. 709/250, 224, 709/205, 200, 201, 226, 102, 104, 227, 229; 710/1, 19, 5, 36; 370/359; 718/102, 104, 718/107

(56) References Cited

U.S. PATENT DOCUMENTS

| | | |
|---|---|---|
| 3,373,408 A | 3/1968 | Ling |
| 3,478,322 A | 11/1969 | Evans |
| 3,792,441 A | 2/1974 | Wymore et al. |
| 3,940,745 A | 2/1976 | Sajeva |
| 4,016,548 A | 4/1977 | Law et al. |
| 4,032,899 A | 6/1977 | Jenny et al. |
| 4,075,691 A | 2/1978 | Davis et al. |
| 4,130,890 A | 12/1978 | Adam |
| 4,400,770 A | 8/1983 | Chan et al. |
| 4,514,807 A | 4/1985 | Nogi |
| 4,523,272 A | 6/1985 | Fukunaga et al. |
| 4,745,544 A | 5/1988 | Renner et al. |
| 4,788,640 A | 11/1988 | Hansen |
| 4,831,358 A | 5/1989 | Ferrio et al. |
| 4,866,664 A | 9/1989 | Burkhardt, Jr. et al. |
| 4,991,112 A | 2/1991 | Callemyn |
| 5,115,507 A | 5/1992 | Callemyn |
| 5,140,685 A | 8/1992 | Sipple et al. |
| 5,142,683 A | 8/1992 | Burkhardt, Jr. et al. |
| 5,155,831 A | 10/1992 | Emma et al. |
| 5,155,854 A | 10/1992 | Flynn et al. |
| 5,168,555 A | 12/1992 | Byers et al. |
| 5,173,897 A | 12/1992 | Schrodi et al. |
| 5,255,239 A | 10/1993 | Taborn et al. |
| 5,263,169 A | 11/1993 | Genusov et al. |
| 5,347,648 A | 9/1994 | Stamm et al. |
| 5,367,678 A | 11/1994 | Lee et al. |
| 5,390,329 A | 2/1995 | Gaertner et al. |
| 5,392,391 A | 2/1995 | Caulk, Jr. et al. |

(Continued)

FOREIGN PATENT DOCUMENTS

EP 0 379 709 8/1990

(Continued)

OTHER PUBLICATIONS

U.S. Appl. No. 10/726,757, filed Dec. 3, 2003, Wolrich et al.

(Continued)

*Primary Examiner*—Marc D. Thompson
(74) *Attorney, Agent, or Firm*—Fish & Richardson P.C.

(57) ABSTRACT

A network processor that has multiple processing elements, each supporting multiple simultaneous program threads with access to shared resources in an interface. Packet data is received from ports in segments and each segment is assigned to one of the program threads. Ordering of segments within packets, and between packets from the same port, is maintained by a scheduler program thread. The scheduler program thread blocks a new assignment of the previously assigned port to a program thread until the program thread to which the port was previously assigned has indicated that it has completed the processing of the segment from that port.

25 Claims, 12 Drawing Sheets

U.S. PATENT DOCUMENTS

| | | | |
|---|---|---|---|
| 5,392,411 A | 2/1995 | Ozaki | |
| 5,392,412 A | 2/1995 | McKenna | |
| 5,404,464 A | 4/1995 | Bennett | |
| 5,404,482 A | 4/1995 | Stamm et al. | |
| 5,432,918 A | 7/1995 | Stamm | |
| 5,448,702 A | 9/1995 | Garcia, Jr. et al. | |
| 5,450,351 A | 9/1995 | Heddes | |
| 5,452,437 A | 9/1995 | Richey et al. | |
| 5,459,842 A | 10/1995 | Begun et al. | |
| 5,463,625 A * | 10/1995 | Yasrebi | 709/102 |
| 5,467,452 A | 11/1995 | Blum et al. | |
| 5,517,648 A | 5/1996 | Bertone et al. | |
| 5,542,070 A | 7/1996 | LeBlanc et al. | |
| 5,542,088 A | 7/1996 | Jennings, Jr. et al. | |
| 5,544,236 A * | 8/1996 | Andruska et al. | 379/201.02 |
| 5,550,816 A * | 8/1996 | Hardwick et al. | 709/100 |
| 5,557,766 A | 9/1996 | Takiguchi et al. | |
| 5,568,476 A | 10/1996 | Sherer et al. | |
| 5,568,617 A | 10/1996 | Kametani | |
| 5,574,922 A | 11/1996 | James | |
| 5,592,622 A | 1/1997 | Isfeld et al. | |
| 5,613,071 A | 3/1997 | Rankin et al. | |
| 5,613,136 A | 3/1997 | Casavant et al. | |
| 5,623,489 A | 4/1997 | Cotton et al. | |
| 5,627,829 A | 5/1997 | Gleeson et al. | |
| 5,630,130 A | 5/1997 | Perotto et al. | |
| 5,644,623 A | 7/1997 | Gulledge | |
| 5,649,157 A | 7/1997 | Williams | |
| 5,659,687 A | 8/1997 | Kim et al. | |
| 5,680,641 A | 10/1997 | Sidman | |
| 5,689,566 A | 11/1997 | Nguyen | |
| 5,699,537 A | 12/1997 | Sharangpani et al. | |
| 5,701,434 A | 12/1997 | Nakagawa | |
| 5,717,898 A | 2/1998 | Kagan et al. | |
| 5,721,870 A | 2/1998 | Matsumoto | |
| 5,740,402 A | 4/1998 | Bratt et al. | |
| 5,742,587 A * | 4/1998 | Zornig et al. | 709/250 |
| 5,742,782 A | 4/1998 | Ito et al. | |
| 5,742,822 A | 4/1998 | Motomura | |
| 5,745,913 A | 4/1998 | Pattin et al. | |
| 5,751,987 A | 5/1998 | Mahant-Shetti et al. | |
| 5,761,507 A * | 6/1998 | Govett | 709/101 |
| 5,761,522 A | 6/1998 | Hisanaga et al. | |
| 5,764,915 A * | 6/1998 | Heimsoth et al. | 709/227 |
| 5,781,774 A | 7/1998 | Krick | |
| 5,784,649 A | 7/1998 | Begur et al. | |
| 5,784,712 A | 7/1998 | Byers et al. | |
| 5,796,413 A | 8/1998 | Shipp et al. | |
| 5,797,043 A | 8/1998 | Lewis et al. | |
| 5,809,235 A * | 9/1998 | Sharma et al. | 709/224 |
| 5,809,530 A | 9/1998 | Samra et al. | |
| 5,812,868 A | 9/1998 | Moyer et al. | |
| 5,828,746 A * | 10/1998 | Ardon | 379/157 |
| 5,828,863 A | 10/1998 | Barrett et al. | |
| 5,832,215 A | 11/1998 | Kato et al. | |
| 5,835,755 A | 11/1998 | Stellwagen, Jr. | |
| 5,850,530 A | 12/1998 | Chen et al. | |
| 5,854,922 A | 12/1998 | Gravenstein et al. | |
| 5,860,158 A | 1/1999 | Pai et al. | |
| 5,886,992 A | 3/1999 | Raatikainen et al. | |
| 5,887,134 A | 3/1999 | Ebrahim | |
| 5,890,208 A | 3/1999 | Kwon | |
| 5,892,979 A | 4/1999 | Shiraki et al. | |
| 5,905,876 A | 5/1999 | Pawlowski et al. | |
| 5,905,889 A | 5/1999 | Wilhelm, Jr. | |
| 5,915,123 A | 6/1999 | Mirsky et al. | |
| 5,918,235 A | 6/1999 | Kirshenbaum et al. | |
| 5,937,187 A | 8/1999 | Kosche et al. | |
| 5,938,736 A | 8/1999 | Muller et al. | |
| 5,940,612 A | 8/1999 | Brady et al. | |
| 5,940,866 A | 8/1999 | Chisholm et al. | |
| 5,946,487 A | 8/1999 | Dangelo | |
| 5,948,081 A | 9/1999 | Foster | |
| 5,958,031 A | 9/1999 | Kim | |
| 5,961,628 A | 10/1999 | Nguyen et al. | |
| 5,970,013 A | 10/1999 | Fischer et al. | |
| 5,978,838 A | 11/1999 | Mohamed et al. | |
| 5,983,274 A | 11/1999 | Hyder et al. | |
| 5,995,513 A | 11/1999 | Harrand et al. | |
| 6,012,151 A * | 1/2000 | Mano | 710/19 |
| 6,014,729 A | 1/2000 | Lannan et al. | |
| 6,023,742 A | 2/2000 | Ebeling et al. | |
| 6,058,168 A | 5/2000 | Braband | |
| 6,061,710 A | 5/2000 | Eickemeyer et al. | |
| 6,067,585 A | 5/2000 | Hoang | |
| 6,070,231 A | 5/2000 | Ottinger | |
| 6,072,781 A | 6/2000 | Feeney et al. | |
| 6,073,215 A | 6/2000 | Snyder | |
| 6,079,008 A | 6/2000 | Clery, III | |
| 6,085,215 A | 7/2000 | Ramakrishnan et al. | |
| 6,085,294 A | 7/2000 | Van Doren et al. | |
| 6,092,127 A | 7/2000 | Tausheck | |
| 6,092,158 A | 7/2000 | Harriman et al. | |
| 6,111,886 A | 8/2000 | Stewart | |
| 6,112,016 A | 8/2000 | MacWilliams et al. | |
| 6,134,665 A | 10/2000 | Klein et al. | |
| 6,141,689 A * | 10/2000 | Yasrebi | 709/228 |
| 6,144,669 A | 11/2000 | Williams et al. | |
| 6,145,054 A | 11/2000 | Mehrotra et al. | |
| 6,157,955 A | 12/2000 | Narad et al. | |
| 6,160,562 A | 12/2000 | Chin et al. | |
| 6,170,051 B1 | 1/2001 | Dowling | |
| 6,182,177 B1 | 1/2001 | Harriman | |
| 6,195,676 B1 * | 2/2001 | Spix et al. | 709/107 |
| 6,199,133 B1 | 3/2001 | Schnell | |
| 6,201,807 B1 | 3/2001 | Prasanna | |
| 6,212,542 B1 | 4/2001 | Kahle et al. | |
| 6,212,611 B1 | 4/2001 | Nizar et al. | |
| 6,216,220 B1 | 4/2001 | Hwang | |
| 6,223,207 B1 * | 4/2001 | Lucovsky et al. | 709/102 |
| 6,223,238 B1 | 4/2001 | Meyer et al. | |
| 6,223,274 B1 | 4/2001 | Catthoor et al. | |
| 6,223,279 B1 | 4/2001 | Nishimura et al. | |
| 6,247,025 B1 | 6/2001 | Bacon | |
| 6,256,713 B1 | 7/2001 | Audityan et al. | |
| 6,272,616 B1 | 8/2001 | Fernando et al. | |
| 6,275,505 B1 | 8/2001 | O'Loughlin et al. | |
| 6,279,113 B1 | 8/2001 | Vaidya | |
| 6,286,083 B1 | 9/2001 | Chin et al. | |
| 6,289,011 B1 | 9/2001 | Seo et al. | |
| 6,298,370 B1 | 10/2001 | Tang et al. | |
| 6,307,789 B1 | 10/2001 | Wolrich et al. | |
| 6,324,624 B1 | 11/2001 | Wolrich et al. | |
| 6,338,078 B1 | 1/2002 | Chang et al. | |
| 6,345,334 B1 | 2/2002 | Nakagawa et al. | |
| 6,347,344 B1 | 2/2002 | Baker et al. | |
| 6,356,962 B1 | 3/2002 | Kasper | |
| 6,360,262 B1 * | 3/2002 | Guenthner et al. | 709/203 |
| 6,366,998 B1 | 4/2002 | Mohamed | |
| 6,373,848 B1 | 4/2002 | Allison et al. | |
| 6,389,449 B1 | 5/2002 | Nermirovsky et al. | |
| 6,393,483 B1 * | 5/2002 | Latif et al. | 370/230 |
| 6,415,338 B1 | 7/2002 | Habot | |
| 6,426,940 B1 | 7/2002 | Seo et al. | |
| 6,427,196 B1 | 7/2002 | Adiletta et al. | |
| 6,430,626 B1 | 8/2002 | Witkowski et al. | |
| 6,434,145 B1 | 8/2002 | Opsasnick et al. | |
| 6,453,404 B1 | 9/2002 | Bereznyi et al. | |
| 6,463,072 B1 | 10/2002 | Wolrich et al. | |
| 6,463,480 B2 | 10/2002 | Kikuchi et al. | |
| 6,463,527 B1 | 10/2002 | Vishkin | |
| 6,466,898 B1 | 10/2002 | Chan | |
| 6,529,983 B1 | 3/2003 | Marshall et al. | |
| 6,532,509 B1 | 3/2003 | Wolrich et al. | |

| | | |
|---|---|---|
| 6,535,878 B1 | 3/2003 | Guedalia et al. |
| 6,552,826 B2 | 4/2003 | Adler et al. |
| 6,560,667 B1 | 5/2003 | Wolrich et al. |
| 6,577,542 B2 | 6/2003 | Wolrich et al. |
| 6,584,522 B1 | 6/2003 | Wolrich et al. |
| 6,587,906 B2 | 7/2003 | Wolrich et al. |
| 6,604,125 B1 | 8/2003 | Belkin |
| 6,606,704 B1 | 8/2003 | Adiletta et al. |
| 6,625,654 B1 | 9/2003 | Wolrich et al. |
| 6,631,430 B1 | 10/2003 | Wolrich et al. |
| 6,631,462 B1 | 10/2003 | Wolrich et al. |
| 6,661,794 B1 | 12/2003 | Wolrich et al. |
| 6,667,920 B2 | 12/2003 | Wolrich et al. |
| 6,668,317 B1 | 12/2003 | Bernstein et al. |
| 6,671,827 B2 | 12/2003 | Guilford et al. |
| 6,681,300 B2 | 1/2004 | Wolrich et al. |
| 6,694,380 B1 | 2/2004 | Wolrich et al. |
| 6,792,488 B2 | 9/2004 | Wolrich et al. |

FOREIGN PATENT DOCUMENTS

| | | |
|---|---|---|
| EP | 0 464 715 | 1/1992 |
| EP | 0 633 678 | 1/1995 |
| EP | 0 745 933 | 12/1996 |
| EP | 0 809 180 | 11/1997 |
| JP | 59111533 | 6/1984 |
| WO | WO 94/15287 | 7/1994 |
| WO | WO 97/38372 | 10/1997 |
| WO | WO 01/15718 | 3/2001 |
| WO | WO 01/16769 | 3/2001 |
| WO | WO 01/16770 | 3/2001 |
| WO | WO 01/16782 | 3/2001 |
| WO | WO 01/48596 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |

OTHER PUBLICATIONS

U.S. Appl. No. 10/684,078, filed Oct. 10, 2003, Wolrich et al.
U.S. Appl. No. 10/664,202, filed Sep. 16, 2003, Wolrich et al.
U.S. Appl. No. 10/644,337, Aug. 20, 2003, Wolrich et al.
U.S. Appl. No. 10/643,438, filed Aug. 19, 2003, Bernstein et al.
U.S. Appl. No. 10/615,500, filed Jul. 8, 2003, Adiletta.
U.S. Appl. No. 10/615,280, filed Jul. 8, 2003, Wolrich et al.
U.S. Appl. No. 10/208/264, filed Jul. 30, 2002, Adiletta et al.
U.S. Appl. No. 09/473,571, Dec. 28, 1999, Wolrich et al.
U.S. Appl. No. 09/387,109, filed Aug. 31, 1999, Adiletta et al.
Byrd et al., "Multithread Processor Architectures," *IEEE Spectrum*, vol. 32, No. 8, New York, Aug. 1, 1995, pp. 38-46.
Doyle et al., *Microsoft Press Computer Dictionary*, 2$^{nd}$ ed., Microsoft Press, Redmond, Washington, USA, 1994, p. 326.
Fillo et al., "The M-Machine Multicomputer," IEEE Proceedings of MICRO-28, 1995, pp. 146-156.

Gomez et al., "Efficient Multithreaded User-Space Transport for Network Computing: Design and Test of the TRAP Protocol," *Journal of Parallel and Distributed Computing*, Academic Press, Duluth, Minnesota, USA, vol. 40, No. 1, Jan. 10, 1997, pp. 103-117.
Haug et al., "Reconfigurable hardware as shared resource for parallel threads," IEEE Symposium of FPGAs for Custom Computing Machines, 1998.
Hauser et al., "Garp: a MIPS processor with a reconfigurable coprocessor," Proceedings of the 5$^{th}$ Annual IEEE Symposium on Field-Programmable Custom Computing Machines, 1997.
Hyde, R., "Overview of Memory Management," *Byte*, vol. 13, No. 4, 1998, pp. 219-225.
Litch et al., "StrongARMing Portable Communications," IEEE Micro, 1998, pp. 48-55.
Schmidt et al., "The Performance of Alternative Threading Architectures for Parallel Communication Subsystems," Internet Document, *Online!*, Nov. 13, 1998.
Thistle et al., "A Processor Architecture for Horizon," IEEE, 1998, pp. 35-41.
Tremblay et al., "A Three Dimensional Register File for Superscalar Processors," IEEE Proceedings of the 28$^{th}$ Annual Hawaii International Conference on System Sciences, 1995, pp. 191-201.
Trimberger et al, "A time-multiplexed FPGA," Proceedings of the 5$^{th}$ Annual IEEE Symposium on Field-Programmable Custom Computing Machines, 1998.
Turner et al., "Design of a High Performance Active Router," Internet Document, *Online*, Mar. 18, 1999.
Vibhatavanijt et al., "Simultaneous Multithreading-Based Routers," Proceedings of the 2000 International Conference of Parallel Processing, Toronto, Ontario, Canada, Aug. 21-24, 2000, pp. 362-359.
Wazlowski et al., "PRSIM-II computer and architecture," IEEE Proceedings, Workshop on FPGAs for Custom Computing Machines, 1993.
"10-/100-Mbps Ethernet Media Access Controller (MAC) Core", NEC, 1998, pp. 1-5.
"Nomadic Threads: A migrating multithread approach to remote memory accesses in multiprocessors", by Jenks, S.; Gaudiot, J.L. (abstract only) Publication Date: Oct. 20-23, 1996.
"Overview of the START (*T) multithreaded computer" by Beckeerie, M.J. (abstract only) Publication Date: Feb. 22-26, 1993.
A. Ippoliti, et al., "Parallel Media Access Controller for Packet Communications at Gb/s Rates", 1990, IEEE, pp. 991-996.
Howard Frazier, "Gigabit Ethernet: From 100 to 1,000 Mbps", 1999, IEEE Internet Computing, pp. 24-31.
Howard Frazier, "The 802.3z Gigabit Ethernet Standard", 1998, IEEE Network, pp. 6-7.

* cited by examiner

FIG. 10A

| 230a | 230b | 230c | 230d | 230e | 230f | 230g | 230h | 230i | 230j | 230k | 230l | 230m | |
|---|---|---|---|---|---|---|---|---|---|---|---|---|---|
| RES | FA | | JL | E2 | E1 | FS | NFE | IG FR | STGRS | TID | RM | RP | 0 |
| | | | | | | | | | | | | | 1 |

| 232a | 232b | 232c | 232d | 232e | 232f | 232g | 232h | 232i | 232j | 232k | 232l | |
|---|---|---|---|---|---|---|---|---|---|---|---|---|
| THRSG | MACPORT/ THD | SOP_ SEQ# | RF | REAR | SE | FE | EFOR | SNOR | VALID BYTES | EOP | SOP | 0 |
| | | | | | | | | | | | | 1 |
| | | | | | | | | | | | | 2 |
| | | | | | | | | | | | | 3 |

233, 233, 233, 233 — 232

PORT BLOCKING TECHNIQUE FOR MAINTAINING RECEIVE PACKET ORDERING FOR A MULTIPLE ETHERNET PORT SWITCH

BACKGROUND OF THE INVENTION

The invention relates generally to network data processing.

Networking products such as routers require high speed components for packet data movement, i.e., collecting packet data from incoming network device ports and queuing the packet data for transfer to appropriate forwarding device ports. They also require high-speed special controllers for processing the packet data, that is, parsing the data and making forwarding decisions. Because the implementation of these high-speed functions usually involves the development of ASIC or custom devices, such networking products are of limited flexibility and thus tend to be quite rigid in their assignment of ports to the high-speed controllers. Typically, each controller is assigned to service network packets from for one or more given ports on a permanent basis.

SUMMARY OF THE INVENTION

In one aspect of the invention, receiving data from ports for processing by processes includes assigning one of the ports to one of the processes, determining that additional data is available from the assigned port and awaiting notification by the process to which the port is assigned that processing has been completed prior to re-assigning the port to one of the processes.

BRIEF DESCRIPTION OF THE DRAWINGS

Other features and advantages of the invention will be apparent from the following description taken together with the drawings in which:

FIGS. 10A and 10B are illustrations of the format of the RCV_REQ FIFO and the RCV_CTL FIFO, respectively.

DETAILED DESCRIPTION

Figure 1:
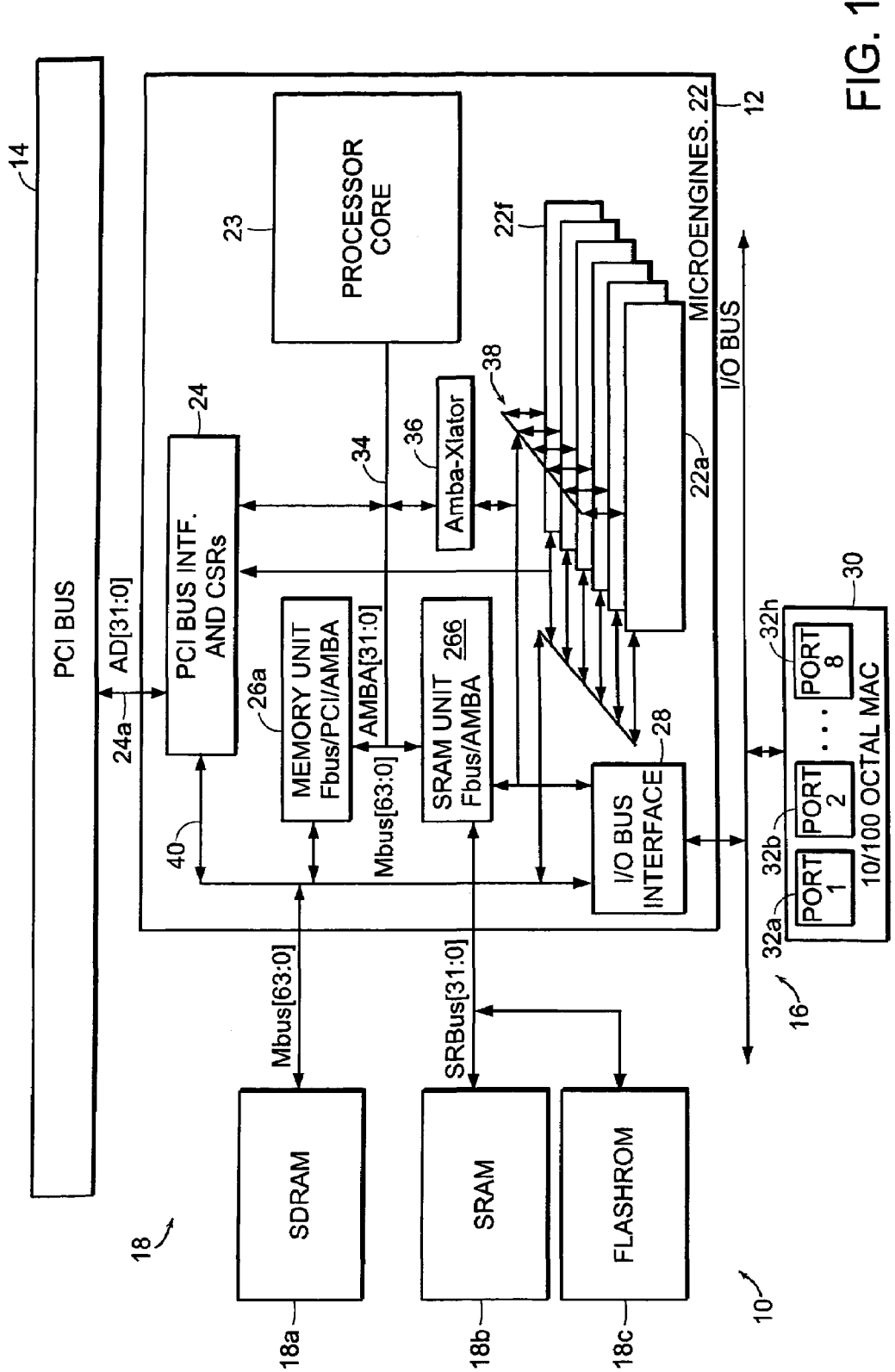
FIG. 1 is a block diagram of a communication system employing a hardware-based multi-threaded processor.
Figure 2:
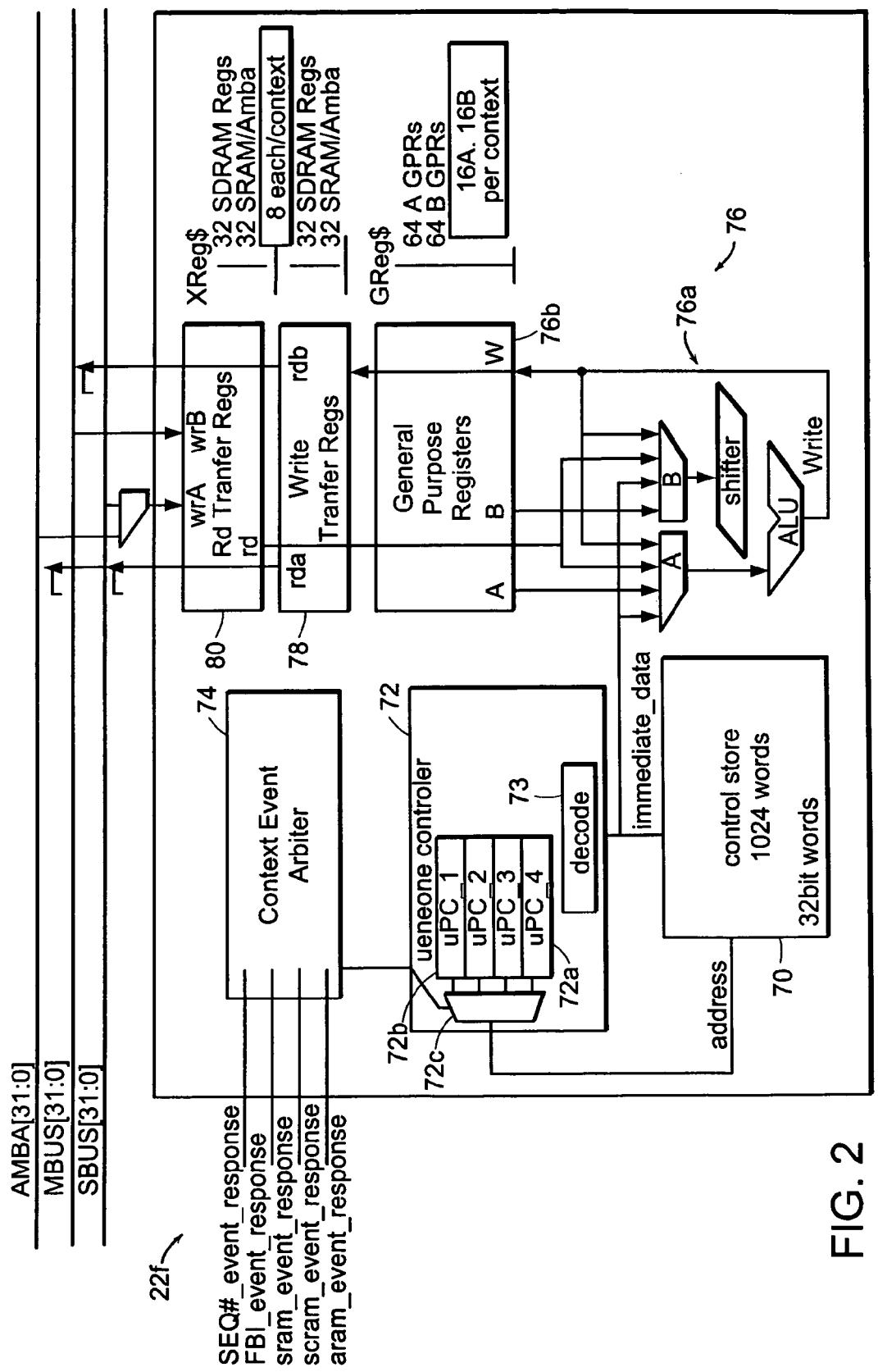
FIG. 2 is a block diagram of a microengine employed in the hardware-based multi-threaded processor of FIG. 1.

Referring to FIG. 1, a communication system 10 includes a parallel, hardware-based multi-threaded processor 12. The hardware based multi-threaded processor 12 is coupled to a first peripheral bus (shown as a PCI bus) 14, a second peripheral bus referred to as an I/O bus 16 and a memory system 18. The system 10 is especially useful for tasks that can be broken into parallel subtasks or functions. The hardware-based multi-threaded processor 12 includes multiple microengines 22, each with multiple hardware controlled threads that can be simultaneously active and independently work on a task. In the embodiment shown, there are six microengines 22a–22f and each of the six microengines is capable of processing four execution threads, as will be described more fully below.

The hardware-based multi-threaded processor 12 also includes a processor 23 that assists in loading microcode control for other resources of the hardware-based multi-threaded processor 12 and performs other general purpose computer type functions such as handling protocols, exceptions, extra support for packet processing where the microengines pass the packets off for more detailed processing. In one embodiment, the processor 23 is a StrongARM (ARM is a trademark of ARM Limited, United Kingdom) core based architecture. The processor (or core) 23 has an operating system through which the processor 23 can call functions to operate on the microengines 22a–22f. The processor 23 can use any supported operating system, preferably real-time operating system. For the core processor implemented as a StrongARM architecture, operating systems such as MicrosoftNT real-time, VXWorks and :CUS, a freeware operating system available over the Internet, can be used.

The six microengines 22a–22f each operate with shared resources including the memory system 18, a PCI bus interface 24 and an I/O bus interface 28. The PCI bus interface provides an interface to the PCI bus 14. The I/O bus interface 28 is responsible for controlling and interfacing the processor 12 to the I/O bus 16. The memory system 18 includes a Synchronous Dynamic Random Access Memory (SDRAM) 18a, which is accessed via an SDRAM controller 26a, a Static Random Access Memory (SRAM) 18b, which is accessed using an SRAM controller 26b, and a nonvolatile memory (shown as a FlashROM) 18c that is used for boot operations. The SDRAM 16a and SDRAM controller 26a are typically used for processing large volumes of data, e.g., processing of payloads from network packets. The SRAM 18b and SRAM controller 26b are used in a networking implementation for low latency, fast access tasks, e.g., accessing look-up tables, memory for the processor 23, and so forth. The microengines 22a– 22f can execute memory reference instructions to either the SDRAM controller 26a or the SRAM controller 18b.

The hardware-based multi-threaded processor 12 interfaces to network devices such as a media access controller device, including a device 30 (e.g., 10/100BaseT Ethernet MAC) over the I/O Bus 16. In the embodiment shown, the device 30 is an 10/100 BaseT Octal MAC device and thus includes 8 ports 32a–32h. Each of the network devices attached to the I/O Bus 16 can include a plurality of ports to be serviced by the processor 12. Other devices, such as a host computer (not shown), that may be coupled to the PCI bus 14 are also serviced by the processor 12. In general, as a network processor, the processor 12 can interface to any type of communication device or interface that receives/sends large amounts of data. The processor 12 functioning as a network processor could receive units of packet data from the device 30 and process those units of packet data in a parallel manner, as will be described. The unit of packet data could include an entire network packet (e.g., Ethernet packet) or a portion of such a packet.

Each of the functional units of the processor 12 are coupled to one or more internal buses. The internal buses include an internal core bus 34 (labeled "AMBA") for coupling the processor 23 to the memory controllers 26a, 26b and to an AMBA translator 36. The processor 12 also includes a private bus 38 that couples the microengines 22a–22f to the SRAM controller 26b, AMBA translator 36 and the Fbus interface 28. A memory bus 40 couples the memory controllers 26a, 26b to the bus interfaces 24, 28 and the memory system 18.

Figure 3:
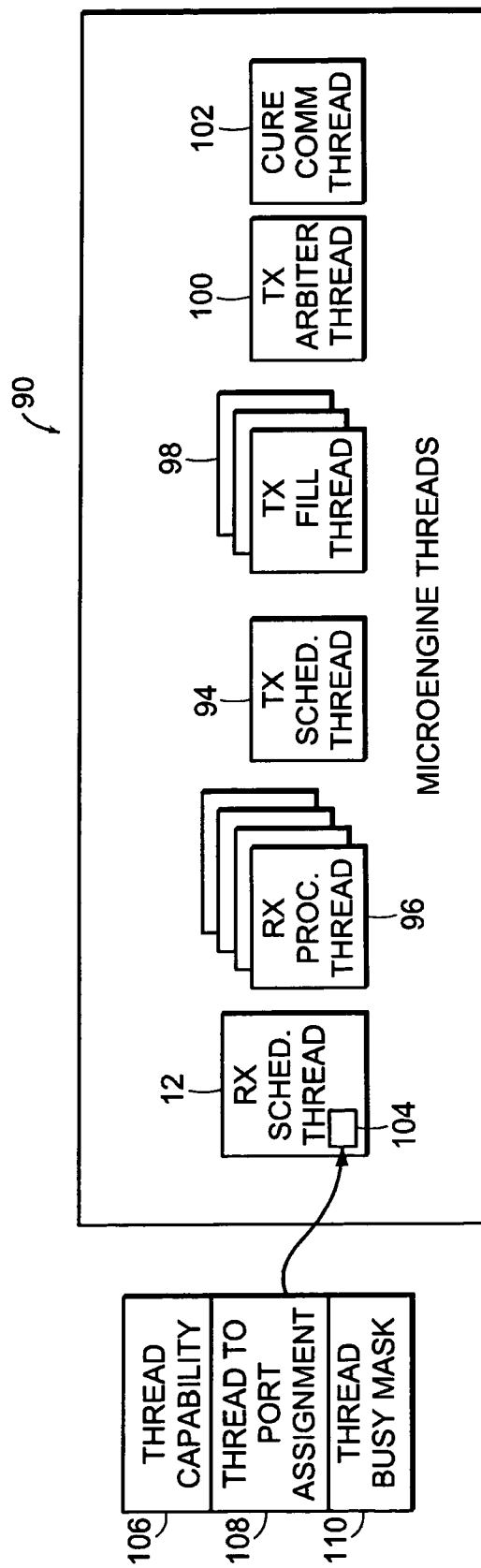
FIG. 3 is an illustration of an exemplary thread task assignment.

Referring to FIG. 3, an exemplary one of the microengines 22a–22f is shown. The microengine 22a includes a control store 70 for storing a microprogram. The microprogram is loadable by the central processor 20. The microengine 70 also includes control logic 72. The control logic 72 includes an instruction decoder 73 and program counter units 72a–72d. The four program counters are maintained in hardware. The microengine 22a also includes context event switching logic 74. The context event switching logic 74 receives messages (e.g., SEQ_#_EVENT_RESPONSE; FBI_EVENT_RESPONSE; SRAM_EVENT_RESPONSE; SDRAM_EVENT_RESPONSE; and AMBA_EVENT_RESPONSE) from each one of the share resources, e.g., SRAM 26b, SDRAM 26a, or processor core 20, control and status registers, and so forth. These messages provides information on whether a requested function has completed. Based on whether or not the function requested by a thread has completed and signaled completion, the thread needs to wait for that complete signal, and if the thread is enabled to operate, then the thread is place on an available thread list (not shown). As earlier mentioned, the microengine 22a can have a maximum of 4 threads of execution available.

In addition to event signals that are local to an executing thread, the microengine employs signaling states that are global. With signaling states, an executing thread can broadcast a signal state to all microengines 22. Any and all threads in the microengines can branch on these signaling states. These signaling states can be used to determine availability of a resource or whether a resource is due for servicing.

The context event logic 74 has arbitration for the four threads. In one embodiment, the arbitration is a round robin mechanism. However, other arbitration techniques, such as priority queuing or weighted fair queuing, could be used. The microengine 22a also includes and execution box (EBOX) data path 76 that includes an arithmetic logic unit (ALU) 76a and a general purpose register (GPR) set 76b. The ALU 76a performs arithmetic and logical functions as well as shift functions.

The microengine 22a further includes a write transfer register file 78 and a read transfer register file 80. The write transfer register file 78 stores data to be written to a resource. The read transfer register file 80 is for storing return data from a resource. Subsequent to or concurrent with the data arrival, an event signal from the respective shared resource, e.g., memory controllers 26a, 26b, or core 23, will be provided to the context event arbiter 74, which in turn alerts the thread that the data is available or has been sent. Both transfer register files 78, 80 are connected to the EBOX 76 through a data path. In the described implementation, each of the register files includes 64 registers.

The functionality of the microengine threads is determined by microcode loaded (via the core processor) for a particular user's application into each microengine's control store 70. Referring to FIG. 3, an exemplary thread task assignment 90 is shown. Typically, one of the microengine threads is assigned to serve as a receive scheduler thread 92 and another as a transmit scheduler thread 94. A plurality of threads are configured as receive processing threads 96 and transmit processing (or "fill") threads 98. Other thread task assignments include a transmit arbiter 100 and one or more core communication threads 102. Once launched, a thread performs its function independently.

The receive scheduler thread 92 assigns packets to receive processing threads 96. In a packet forwarding application for a bridge/router, for example, the receive processing thread parses packet headers and performs lookups based in the packet header information. Once the receive processing thread or threads 96 has processed the packet, it either sends the packet as an exception to be further processed by the core 23 (e.g., the forwarding information cannot be located in lookup and the core processor must learn it), or stores the packet in the SDRAM and queues the packet in a transmit queue by placing a packet link descriptor for it in a transmit queue associated with the transmit (forwarding port) indicated by the header/lookup. The transmit queue is stored in the SRAM. The transmit arbiter thread 100 prioritizes the transmit queues and the transmit scheduler thread 94 assigns packets to transmit processing threads that send the packet out onto the forwarding port indicated by the header/lookup information during the receive processing.

The receive processing threads 96 may be dedicated to servicing particular ports or may be assigned to ports dynamically by the receive scheduler thread 92. For certain system configurations, a dedicated assignment may be desirable. For example, if the number of ports is equal to the number of receive processing threads 96, then it may be quite practical as well as efficient to assign the receive processing threads to ports in a one-to-one, dedicated assignment. In other system configurations, a dynamic assignment may provide a more efficient use of system resources.

The receive scheduler thread 92 maintains scheduling information 104 in the GPRs 76b of the microengine within which it executes. The scheduling information 104 includes thread capabilities information 106, port-to-thread assignments (list) 108 and "thread busy" tracking information 110. At minimum, the thread capabilities information informs the receive scheduler thread as to the type of tasks for which the other threads are configured, e.g., which threads serve as receive processing threads. Additionally, it may inform the receive scheduler thread of other capabilities that may be appropriate to the servicing of a particular port. For instance, a receive processing thread may be configured to support a certain protocol, or a particular port or ports. A current list of the ports to which active receive processing threads have been assigned by the receive scheduler thread is maintained in the thread-to-port assignments list 108. The thread busy mask register 110 indicates which threads are actively servicing a port. The receive scheduler thread uses all of this scheduling information in selecting threads to be assigned to ports that require service for available packet data, as will be described in further detail below.

Figure 4:
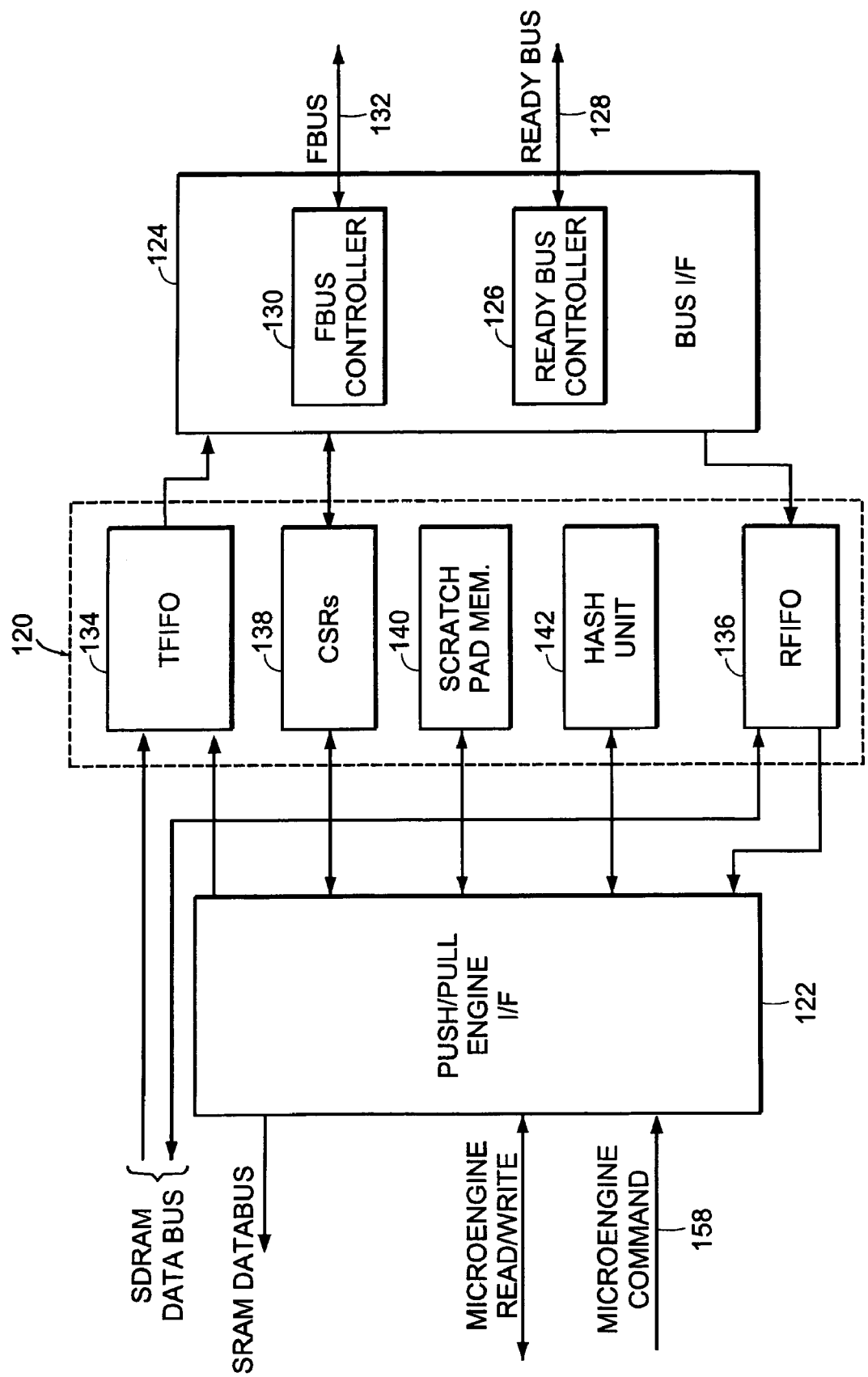
FIG. 4 is a block diagram of an I/O bus interface shown in FIG. 1.

Referring to FIG. 4, the I/O bus interface 28 includes shared resources 120, which are coupled to a push/pull engine interface 122 and a bus interface unit 124. The bus interface unit 124 includes a ready bus controller 126 connected to a ready bus 128 and an Fbus controller 130 for connecting to a portion of the I/O bus referred to as an Fbus 132. Collectively, the ready bus 128 and the Fbus 132 make up the signals of the I/O bus 16 (FIG. 1). The resources 120 include two FIFOs, a transmit FIFO 134 and a receive FIFO 136, as well as CSRs 138, a scratchpad memory 140 and a hash unit 142. The Fbus 132 transfers data between the ports of the device 30 and the I/O bus interface 28. The ready bus 128 is an 8-bit bus that performs several functions. It is used to read control information about data availability from the device 30, e.g., in the form of ready status flags. It also provides flow control information to the device 30 and may be used to communicate with another network processor 12 that is connected to the Fbus 132. Both buses 128, 132 are accessed by the microengines 22 through the CSRs 138. The CSRs 138 are used for bus configuration, for accessing the bus interface unit 124, and for inter-thread signaling. They also include a several counters and thread status registers, as will be described. The CSRs 138 are accessed by the microengines 22 and the core 23. The receive FIFO(RFIFO) 136 includes data buffers for holding data received from the Fbus 132 and is read by the microengines 22. The transmit FIFO (TFIFO) 134 includes data buffers that hold data to be transmitted to the Fbus 132 and is written by the microengines 22. The scatchpad memory 140 is accessed by the core 23 and microengines 22, and supports a variety of operations, including read and write operations, as well as bit test, bit test/clear and increment operations. The hash unit 142 generates hash indexes for 48-bit or 64-bit data and is accessed by the microengines 22 during lookup operations.

The processors 23 and 22 issue commands to the push/pull engine interface 122 when accessing one of the resources 120. The push/pull engine interface 122 places the commands into queues (not shown), arbitrates which commands to service, and moves data between the resources 120, the core 23 and the microengines 22. In addition to servicing requests from the core 23 and microengines 22, the push/pull engines 122 also service requests from the ready bus 128 to transfer control information to a register in the microengine read transfer registers 80.

When a thread issues a request to a resource 120, a command is driven onto an internal command bus 150 and placed in queues within the push/pull engine interface 122. Receive/read-related instructions (such as instructions for reading the CSRS) are written to a "push" command queue.

The CSRs 138 include the following types of registers: Fbus receive and transmit registers; Fbus and ready bus configuration registers; ready bus control registers; hash unit configuration registers; interrupt registers; and several miscellaneous registers, including a thread status registers. Those of the registers which pertain to the receive process will be described in further detail.

The interrupt/signal registers include an INTER_THD_SIG register for inter-thread signaling. Any thread within the microengines 22 or the core 23 can write a thread number to this register to signal an inter-thread event.

Figure 5:
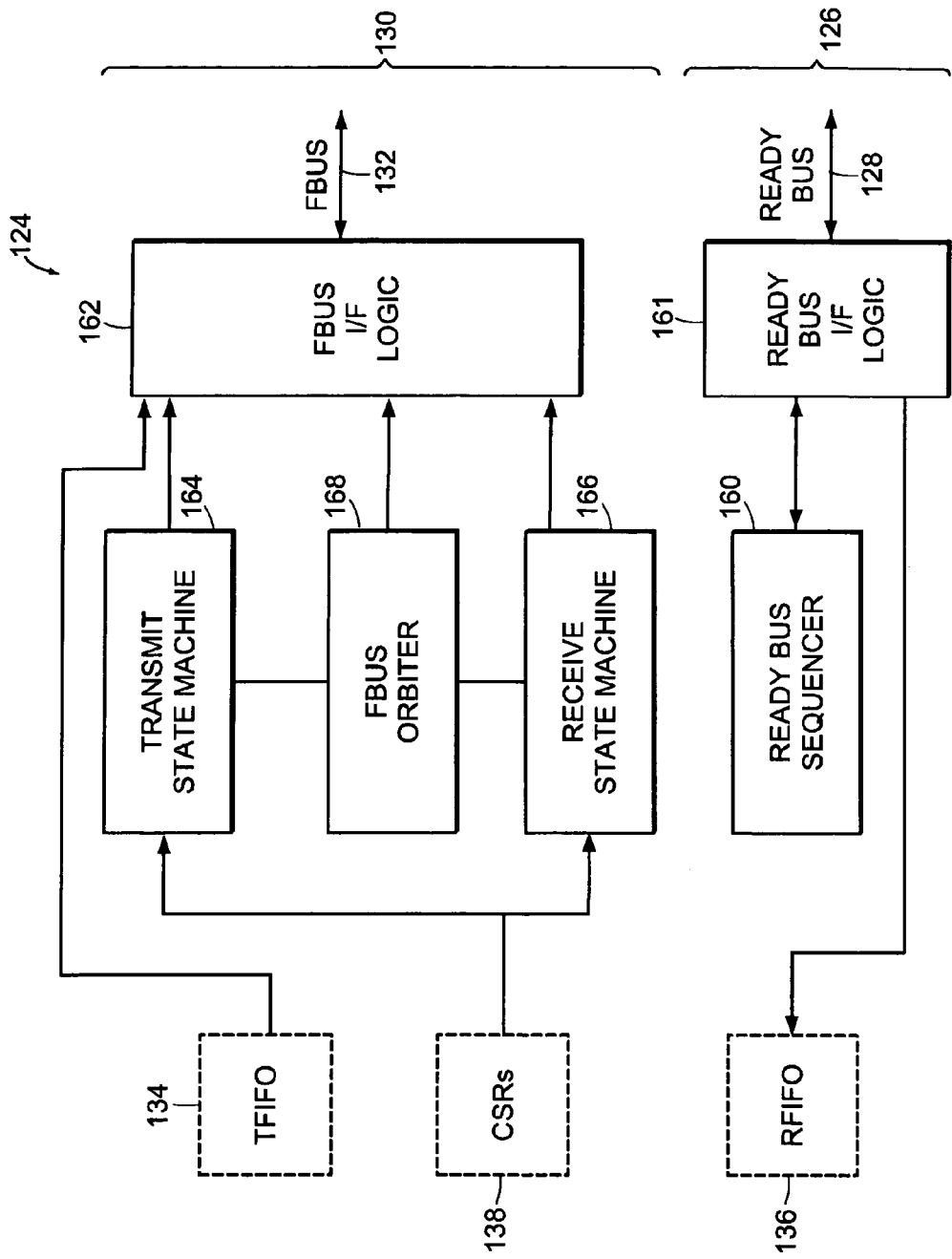
FIG. 5 is a detailed diagram of a bus interface unit employed by the I/O bus interface of FIG. 4.

Further details of the Fbus controller 130 and the ready bus controller 126 are shown in FIG. 5. The ready bus controller 126 includes a programmable sequencer 160 for retrieving MAC device status information from the MAC device 30 and asserting flow control to the MAC device over the ready bus 128 via ready bus interface logic 161. The Fbus controller 130 includes Fbus interface logic 162, which is used to transfer data to and from the device 30, is controlled by a transmit state machine (TSM) 164 and a receive state machine (RSM) 166. In the embodiment herein, the Fbus 132 may be configured as a bidirectional 64-bit bus, or two dedicated 32-bit buses. In the unidirectional, 32-bit configuration, each of the state machines owns its own 32-bit bus. In the bidirectional configuration, the ownership of the bus is established through arbitration. Accordingly, the Fbus controller 130 further includes a bus arbiter 168 for selecting which state machine owns the Fbus 132.

Figure 6A:
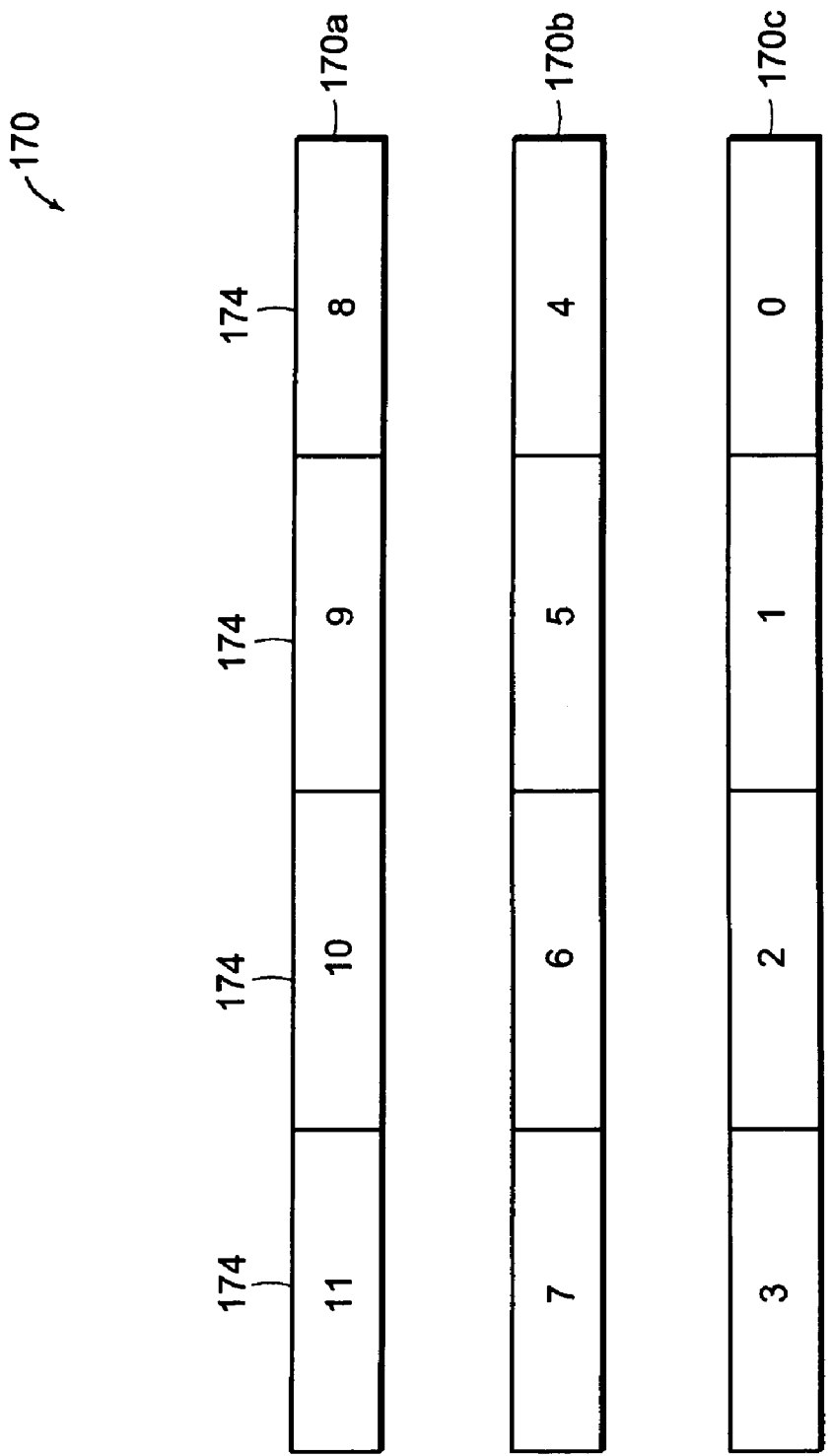
FIGS. 6A–6D are illustrations of various bus configuration control and status registers (CSRs)
Figure 6B:
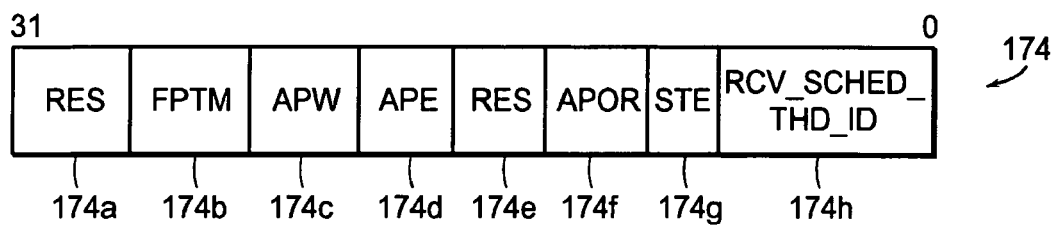
Figure 6C:
Figure 6D:
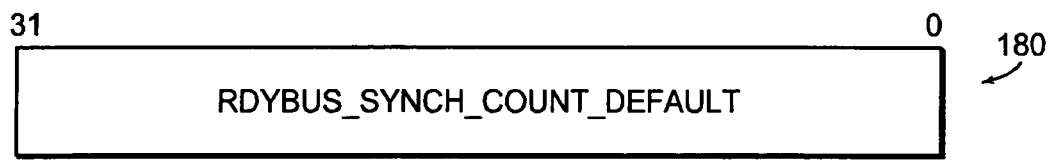

Some of the relevant CSRs used to program and control the ready bus 128 and Fbus 132 for receive processes are shown in FIGS. 6A–6D. Referring to FIG. 6A, RDYBUS_TEMPLATE_PROGx registers 170 are used to store instructions for the ready bus sequencer. Each register of these 32-bit registers 170a, 170b, 170c, includes four, 8-bit instruction fields 172. Referring to FIG. 6B, a RCV_RDY_CTL register 174 specifies the behavior of the receive state machine 166. The format is as follows: a reserved field (bits 31:15) 174a; a port mode field (bits 14:13) 174b, which does not pertain to the receive process for device 30 and therefore will not be described further herein; an auto push prevent window field (bits 12:10) 174c for specifying the autopush prevent window used by the ready bus sequencer to prevent the receive scheduler from accessing its read transfer registers when an autopush operation (which pushes information to those registers) is about to begin; an autopush enable (bit 9) 174d, used to enable autopush of the receive ready flags; another reserved field (bit 8) 174e; an autopush destination field (bits 7:6) 174f for specifying an autopush operation's destination register; a signal thread enable field (bit 5) 174g which, when set, indicates the thread to be signaled after an autopush operation; and a receive scheduler thread ID (bits 4:0) 174h, which specifies the ID of the microengine thread that has been configured as a receive scheduler.

Although not depicted in detail, other bus registers include the following: a RDYBUS_TEMPLATE_CTL register 178 (FIG. 6C), which maintains the control information for the ready bus and the Fbus controllers, for example, it enables the ready bus sequencer; and a RDYBUS_SYNCH_COUNT_DEFAULT register 180 (FIG. 6D), which specifies the program cycle rate of the ready bus sequencer 160.

Figure 7:
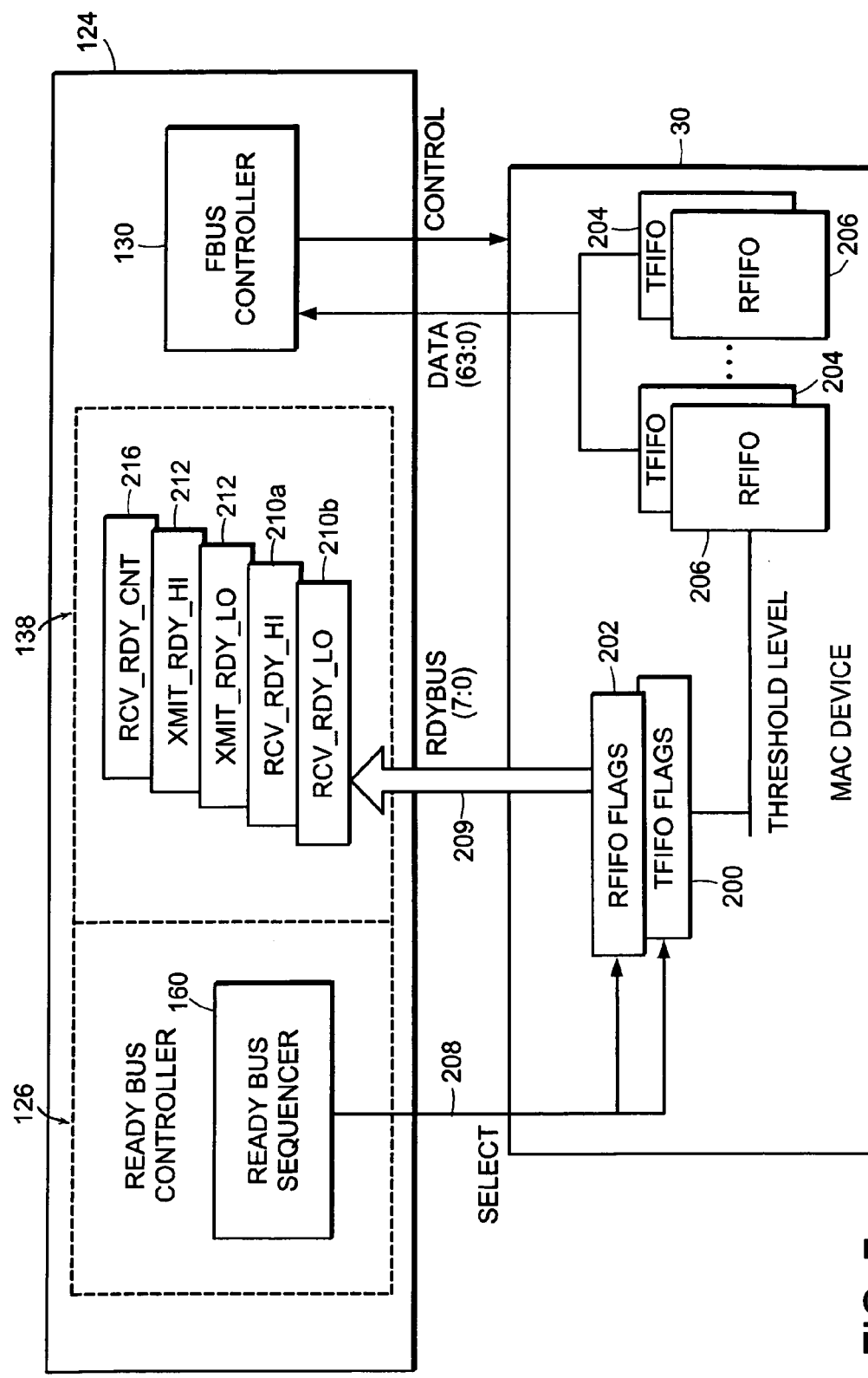
FIG. 7 is a detailed diagram illustrating the interconnection between a plurality of 10/100 Ethernet ports and the bus interface unit.

Referring to FIG. 7, the MAC device 30 provides transmit status flags 200 and receive status flags 202 that indicate whether the amount of data in an associated transmit FIFO 204 or receive FIFO 206 has reached a certain threshold level. The ready bus sequencer 160 periodically polls the ready flags (after selecting either the receive ready flags 202 or the transmit ready flags 200 via a flag select 208) and places them into appropriate ones of the CSRs 138 by transferring the flag data over ready bus data lines 209. In this embodiment, the ready bus includes 8 data lines for transferring flag data from each port to the Fbus interface unit 124. The CSRs in which the flag data are written are defined as RCV_RDY_HI/LO registers 210 for receive ready flags and XMIT_RDY_HI/LO registers 212 for transmit ready flags, if the ready bus sequencer 160 is programmed to execute receive and transmit ready flag read instructions, respectively.

When the ready bus sequencer 160 is programmed with an appropriate instruction directing it to interrogate MAC receive ready flags, it reads the receive ready flags from the MAC device (or devices) specified in the instruction and places the flags into a RCV_RDY_HI register 210a and a RCV_RDY_LO register 210b, collectively, RCV_RDY registers 210. Each bit in these registers corresponds to a different device port on the I/O bus.

The RCV_RDY_CNT register 216 is one of several used by the receive scheduler to determine how to issue a receive request. It also indicates whether a flow control request is issued.

Figure 8A:
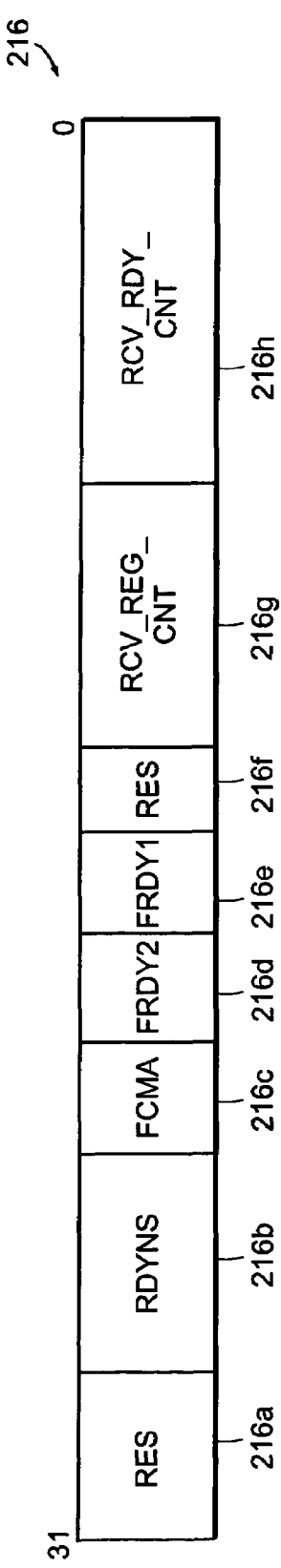
FIGS. 8A–8C are illustrations of the formats of the RCV_RDY_CTL, RCV_RDY_HI and RCV_RDY_LO CSR registers, respectively.

Referring to FIG. 8A, the format of the RCV_RDY_CNT register 216 is as follows: bits 31:28 are defined as a reserved field 216a; bit 27 is defined as a ready bus master field 216b and is used to indicate whether the ready bus 128 is configured as a master or slave; a field corresponding to bit 26 216c provides flow control information; bits 25 and 24, corresponding to a pair of ready status fields 126d and 216e, respectively, are not pertinent to the receive process for device 30 and therefore will not described herein; bits 23:16 correspond to a reserved field 216f; a receive request count field (bits 15:8) 216g specifies a receive request count, which is incremented after the RSM 166 completes a receive request and data is available in the RFIFO 136; a receive ready count field (bits 7:0) 216h specifies a receive ready count, an 8-bit counter that is incremented each time the ready bus sequencer 160 writes the ready bus registers RCV_RDY_CNT register 216, the RCV_RDY_LO register 210b and RCV_RDY_HI register 210a to the receive scheduler read transfer registers.

There are two techniques for reading the ready bus registers: "autopush" and polling. The autopush instruction may be executed by the ready bus sequencer 160 during a receive process (rxautopush) or a transmit process (txautopush). Polling requires that a microengine thread periodically issue read references to the I/O bus interface 28.

The rxautopush operation performs several functions. It increments the receive ready count in the RCV_RDY_CNT register 216. If enabled by the RCV_RDY_CTL register 174, it automatically writes the RCV_RDY_CNT 216, the RCV_RDY_LO and RCV_RDY_HI registers 210b, 210a to the receive scheduler read transfer registers and signals to the receive scheduler thread 92 (via a context event signal) when the rxautopush operation is complete.

The ready bus sequencer 160 polls the MAC FIFO status flags periodically and asynchronously to other events occurring in the processor 12. Ideally, the rate at which the MAC FIFO ready flags are polled is greater than the maximum rate at which the data is arriving at the MAC ports. Thus, it is necessary for the receive scheduler thread 92 to determine whether the MAC FIFO ready flags read by the ready bus sequencer 160 are new, or whether they have been read already. The rxautopush instruction increments the receive ready count in the RCV_RDY_CNT register 216 each time the instruction executes. The RCV_RDY_CNT register 216 can be used by the receive scheduler thread 92 to determine whether the state of specific flags have to be evaluated or whether they can be ignored because receive requests have been issued and the port is currently being serviced.

When the receive ready count is used to monitor the freshness of the ready flags, there is a possibility that the ready flags will be ignored when they are providing new status. For a more accurate determination of ready flag freshness, the receive request count may be used. Each time a receive request is completed and the receive control information is pushed onto the RCV_CNTL register 232, the the RSM 166 increments the receive request count. The count is recorded in the RCV_RDY_CNT register the first time the ready bus sequencer executes an rxrdy instruction for each program loop. The receive scheduler thread 92 can use this count to track how many requests the receive state machine has completed. As the receive scheduler thread issues commands, it can maintain a list of the receive requests it submits and the ports associated with each such request.

Figure 8B:
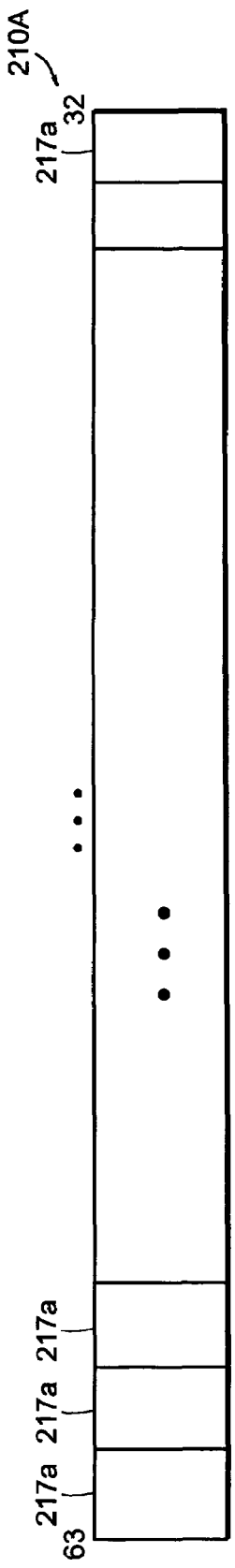
Figure 8C:
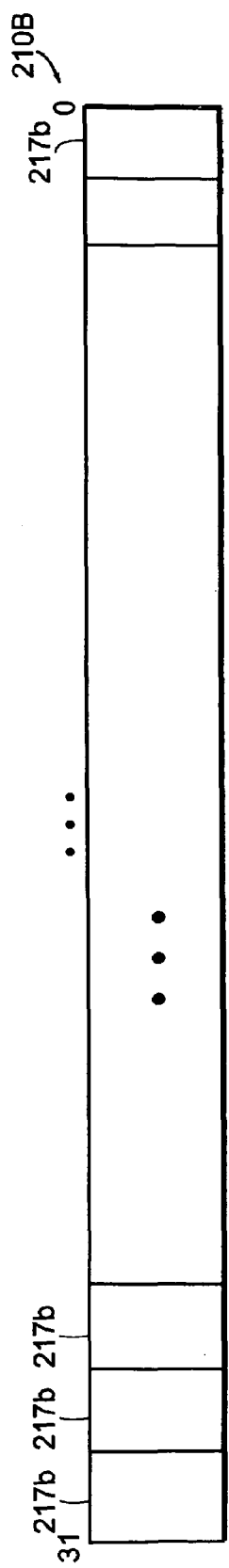

Referring to FIGS. 8B and 8C, the registers RCV_RDY_HI 210a and RCV_RDY_LO 210b have a flag bit 217a, 217b, respectively, corresponding to each port.

Figure 9:
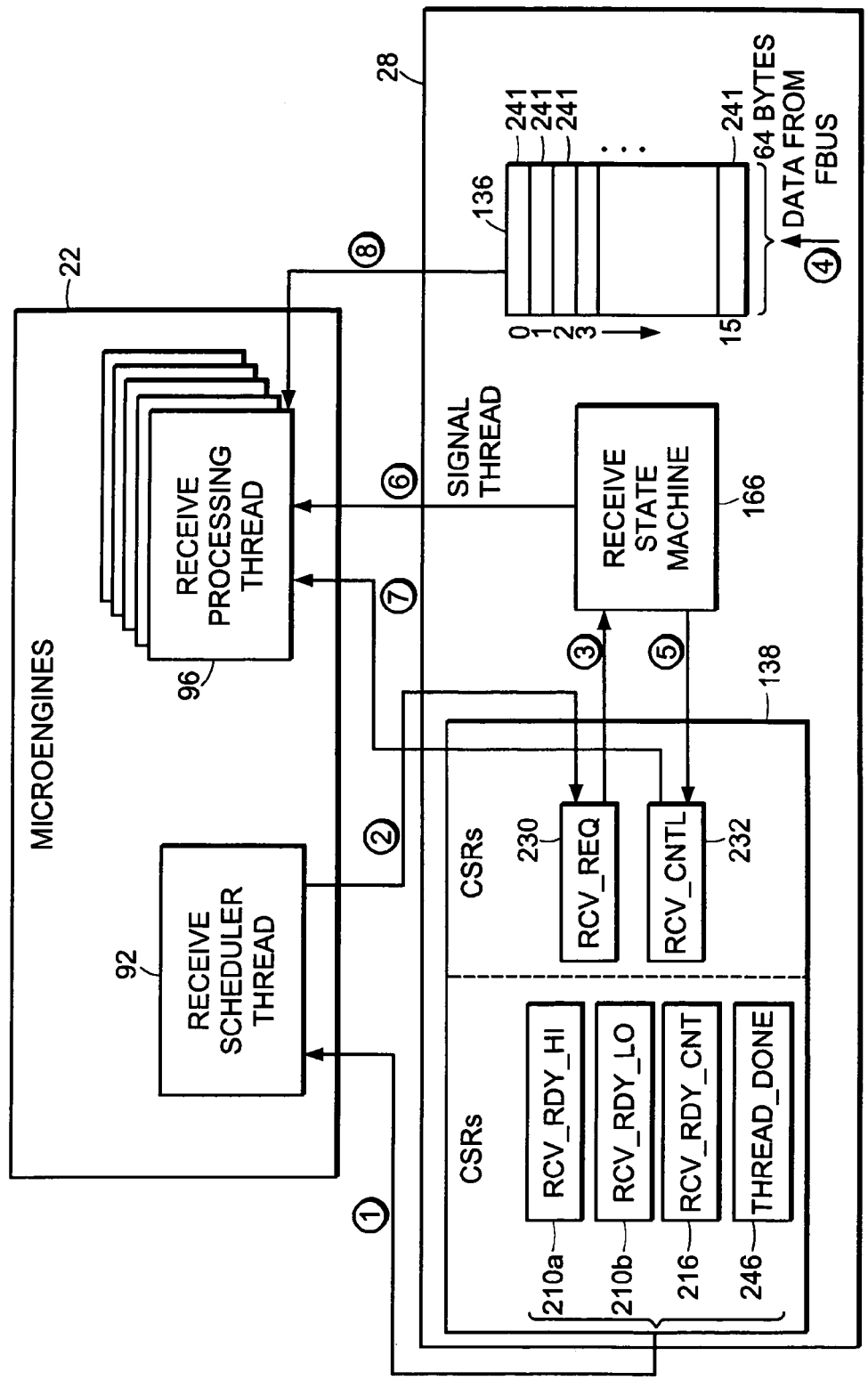
FIG. 9 is a depiction of the receive threads and their interaction with the I/O bus interface during a receive process.

Referring to FIG. 9, the receive scheduler thread 92 performs its tasks at a rate that ensures that the RSM 166 is always busy, that is, that there is always a receive request waiting to be processed by the RSM 166. Several tasks performed by the receive scheduler thread 92 are as follows. The receive scheduler thread 92 determines which ports need to be serviced by reading the RCV_RDY_HI, RCV_RDY_LO and RCV_RDY_CNT registers 210a, 210b and 216, respectively. The receive scheduler thread 92 also determines which receive ready flags are new and which are old using either the receive request count or the receive ready count in the RCV_RDY_CNT register, as described above. It tracks the thread processing status of the other microengine threads by reading thread done status CSRs 240. The receive scheduler thread 92 initiates transfers across the Fbus 132 via the ready bus, while the receive state machine 166 performs the actual read transfer on the Fbus 132. The receive scheduler 92 interfaces to the receive state machine 166 through two FBI CSRs 138: an RCV_REQ register 230 and an RCV_CNTL register 232. The RCV_REQ register 230 instructs the receive state machine on how to receive data from the Fbus 132.

Still referring to FIG. 9, a process of initiating the Fbus receive transfer is as follows. Having received ready status information from the RCV_RDY_HI/LO registers 210a, 210b as well as thread availability from the thread done register 240 (transaction 1, as indicated by the arrow labeled "1"), the receive scheduler thread 92 determines if there is room in the RCV_REQ FIFO 230 for another receive request. If it determines that RCV_REQ FIFO 230 has room to receive a request, the receive scheduler thread 92 writes a receive request by pushing data into the RCV_REQ FIFO 230 (transaction 2). The RSM 166 processes the request in the RCV_REQ FIFO 230 (transaction 3). The RSM 166 responds to the request by moving the requested data into the RFIFO 136 (transaction 4), writing associated control information to the RCV_CTL FIFO 232 (transaction 5) and generating a start_receive signal event to the receive processing thread 96 specified in the receive request (transaction 6). The RFIFO 136 includes 16 elements 241, each element for storing a 64 byte unit or segment of data referred to herein as a MAC packet ("MPKT"). The RSM 166 reads packets from the MAC ports in fragments equal in size to one or two RFIFO elements, that is, MPKTS. The specified receive processing thread 96 responds to the signal event by reading the control information from the RCV_CTL register 232 (transaction 7). It uses the control information to determine, among other pieces of information, where the data is located in the RFIFO 136. The receive processing thread 96 reads the data from the RFIFO 136 on quadword boundaries into its read transfer registers or moves the data directly into the SDRAM (transaction 8).

The RCV_REQ register 230 is used to initiate a receive transfer on the Fbus and is mapped to a two-entry FIFO that is written by the microengines. The I/O bus interface 28 provides signals (not shown) to the receive scheduler thread indicating that the RCV_REQ FIFO 236 has room available for another receive request and that the last issued receive request has been stored in the RCV_REQ register 230.

Referring to FIG. 10A, the RCV_REQ FIFO 230 includes two entries 231. The format of each entry 231 is as follows. The first two bits correspond to a reserved field 230a. Bit 29 is an FA field 230b for specifying the maximum number of Fbus accesses to be performed for this request. A THSG field (bits 28:27) 230c is a two-bit thread message field that allows the scheduler thread to pass a message to the assigned receive thread through the ready state machine, which copies this message to the RCV_CNTL register. An SL field 230d (bit 26) is used in cases where status information is transferred following the EOP MPKT. It indicates whether two or one 32-bit bus accesses are required in a 32-bit Fbus configuration. An E1 field 230e (bits 21:18) and an E2 field (bits 25:22) 230f specify the RFIFO element to receive the transferred data. If only 1 MPKT is received, it is placed in the element indicated by the E1 field. If two MPKTs are received, then the second MPKT is placed in the RFIFO element indicated by the E2 field. An FS field (bits 17:16) 230g specifies use of a fast or slow port mode, that is, whether the request is directed to a fast (e.g., Gigabit) or slow (e.g., 10/100) port. An NFE field (bit 15) 230h specifies the number of RFIFO elements to be filled (i.e., one or two elements). The IGFR field (bit 13) 230i is used only if fast port mode is selected and indicates to the RSM that it should process the request regardless of the status of the fast ready flag pins. An SIGRS field (bit 11) 230j, if set, indicates that the receive scheduler be signaled upon completion of the receive request. A TID field (bits 10:6) 230k specifies the receive thread to be notified or signaled after the receive request is processed. Therefore, if bit 11 is set, the RCV_REQ entry is read twice, once by the receive thread and once by the receive scheduler thread, before it can be removed from the RCV_REQ FIFO. An RM field (bits 5:3) 230l specified the ID of the MAC device that has been selected by the receive scheduler. Lastly, an RP field (bits 2:0) 230m specifies which port of the MAC device specified in the RM field 230l has been selected.

The RSM 166 reads the RCV_REQ register entry 231 to determine how it should receive data from the Fbus 132, that is, how the signaling should be performed on the Fbus, where the data should be placed in the RFIFO and which microengine thread should be signaled once the data is received. The RSM 166 looks for a valid receive request in the RCV_REQ FIFO 230. It selects the MAC device identified in the RM field 230m and selects the specified port within the RP field 230l by asserting the appropriate control signals. It then begins receiving data from the MAC device on the Fbus data lines. The RSM 166 always attempts to read either eight or nine quadwords of data from the MAC device on the Fbus as specified in the receive request. If the MAC device 30 asserts the EOP signal, the RSM 166 terminates the receive early (before eight or nine accesses are made). The RSM 166 calculates the total bytes received for each receive request and reports the value in the RCV_CNTL register 232. If EOP is received, the RSM 166 determines the number of valid bytes in the last received data cycle.

The RCV_CNTL register 232 is mapped to a four-entry FIFO (referred to herein as RCV_CNTL_FIFO 232) that is written by the receive state machine and read by a microengine thread. The I/O bus interface 28 signals the assigned thread when a valid entry reaches the top of the RCV_CNTL FIFO. When a microengine thread reads the RCV_CNTL register, the data is popped off the FIFO. If the SIGRS field 230i is set in the RCV_REQ register 230, the receive scheduler thread 92 specified in the RCV_CNTL register 232 is signaled in addition to the thread specified in TID field 230k. In this case, the data in the RCV_CNTL register 232 must be read twice before the receive request data is retired from the RCV_CNTL FIFO 232 and the next thread is signaled. The receive state machine writes to the RCV_CTL register 232 as long as the FIFO is not full. If the RCV_CTL FIFO 232 is full, the receive state machine stalls and stops accepting any more receive requests.

Referring to FIG. 10B, the RCV_CNTL FIFO 232 provides instruction to the signaled thread (i.e., the thread specified in TID) to process the data. As indicated above, the RCV_CNTL FIFO includes 4 entries 233. The format of the RCV_CNTL FIFO entry 233 is as follows: a THMSG field (31:30) 23a includes the 2-bit message copied by the RSM from REC_REQ register[28:27]. A MACPORT/THD field (bits 29:24) 232b specifies the MAC port number. An SOP SEQ field (23:20) 232c may be used to indicate a packet sequence number as an SOP (start-of-packet) sequence number if the SOP was asserted during the receive data transfer and indicates an MPKT sequence number if SOP was not so asserted. Sequence numbers do not pertain to the receive process for device 30 and thus will not be discussed further. An RF field 232d and RERR field 232e (bits 19 and 18, respectively) both convey receive error information. An SE field 232f (17:14) and an FE field 232g (13:10) are copies of the E2 and E1 fields, respectively, of the REC_REQ. An EF field (bit 9) 232h specifies the number of RFIFO elements which were filled by the receive request. An SN field (bit 8) 232i may be used to indicate whether the sequence number specified in SOP_SEQ field 232c is associated with one of two particular ports. Again, this field does not pertain to the receive process for device 30 and thus will not be described further. A VLD BYTES field (7:2) 232j specifies the number of valid bytes in the RFIFO element if the element contains in EOP MPKT. An EOP field (bit 1) 232k indicates that the MPKT is an EOP MPKT. An SOP field (bit 0) 232l indicates that the MPKT is an SOP MPKT.

As indicated above, the thread done registers 240 are used for inter-thread communications. They can be read and written to by the threads using a CSR instruction. These registers allow the receive scheduler thread to determine which RFIFO elements are not in use. Since it is the receive scheduler 92 that assigns receive processing threads 96 to process the data in the RFIFO elements, and it also knows the thread processing status from the thread done registers 240, it can determine which RFIFO elements are currently available.

The thread done registers 240 support a two-bit message for each microengine thread. The assigned receive thread may write a two-bit message to this register to indicate that it has completed its task. Each time a message is written to the THREAD_DONE register, the current message is logically ORed with the new message. The bit values in the THREAD_DONE registers are cleared by writing a "1", so the scheduler may clear the messages by writing the data read back to the THREAD_DONE register. The definition of the 2-bit status field is determined in software. The assigned receive processing threads write their status to the THREAD_DONE register whenever the status changes. When the receive scheduler thread reads the THREAD_DONE register, it can look at the returned value to determine the status of each thread and then update its thread/port assignment list.

To maintain packet order for packets received from slow ports such as port 32 of MAC 30, the network processor 12 employs a port blocking mechanism. The packet rate of a slow port is such that the rate at which the RSM reads MPKTs from the port is slow enough that a receive processing thread can process an MPKT before the RSM brings in another MPKT from the same port. The port blocking mechanism ensures that each MPKT is processed serially. In other words, each receive request is processed by a receive processing thread and placed into a buffer in memory before another receive request is issued to the same port. The receive state machine processes the receive request and wakes the assigned microengine thread. The assigned micoengine thread processes the receive request, places the processed data in memory and signals the receive scheduler that the received request is complete. It signals the receive scheduler using the thread done registers. The receive scheduler thread must poll the registers periodically to determine thread status.

Figure 11:
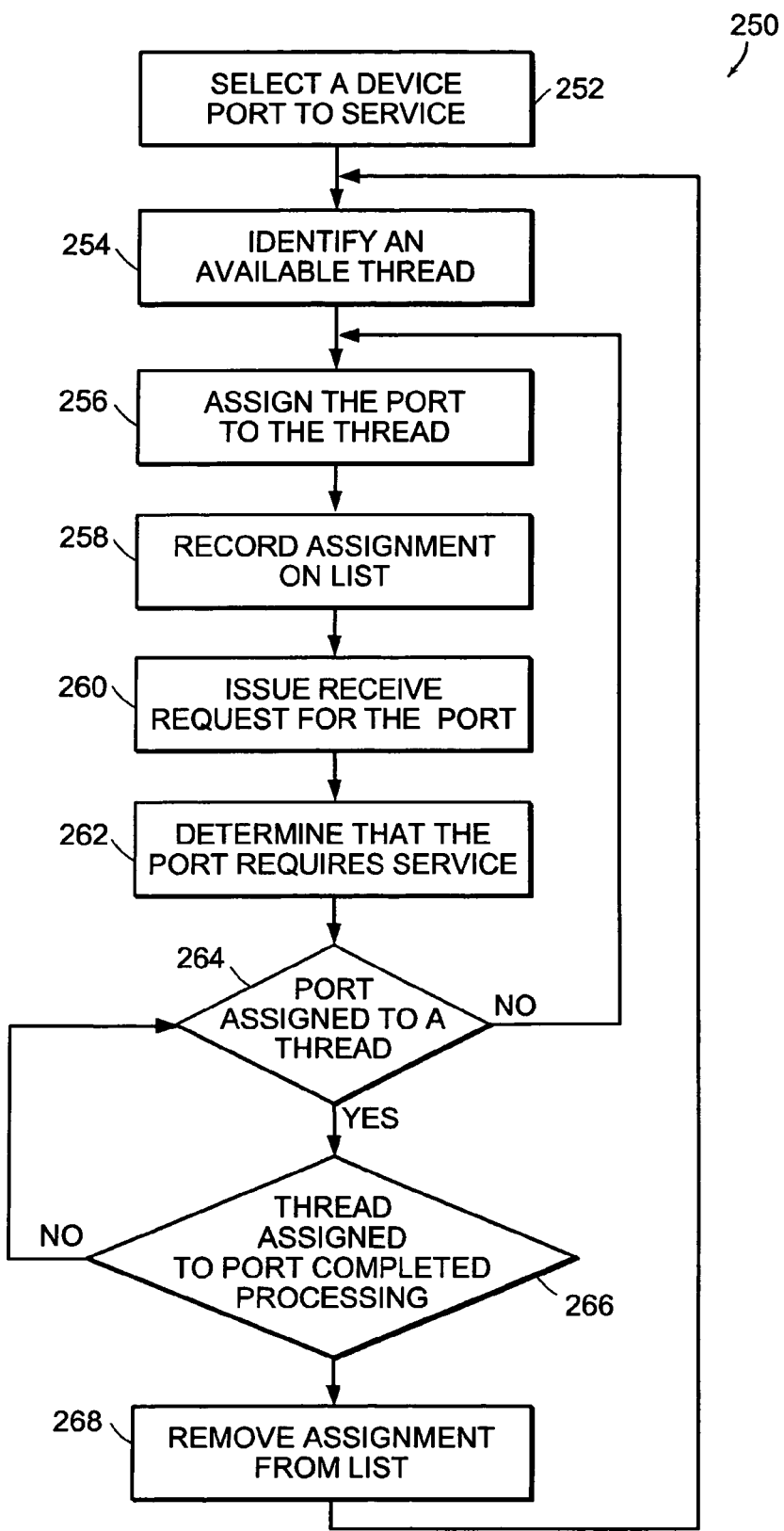
FIG. 11 is a flow diagram of a port blocking mechanism employed by the receive scheduler.

Referring to FIG. 11, a port blocking procedure 250 performed by the receive scheduler thread 92 for the ports 32 is as follows. The receive scheduler thread selects 252 a port that it has determined needs service (by checking the receive ready flags) and identifies 254 a receive processing thread as available to process a receive request (via the thread done registers). The receive scheduler thread assigns 256 the selected port to the thread. The receive scheduler thread updates 258 its internal port-to-thread assignment list for the new port-to-thread assignment for the selected port. The receiver scheduler thread issues 260 a receive request for the port.

The receive scheduler thread determines 262 that the port has data ready for transfer and therefore requires service. The receive scheduler thread determines 264 if the port is already assigned to a receive processing thread by checking the updated port-to-thread assignment. If the port is assigned to a receive processing thread, the receive scheduler thread continues to check the status of the receive processing thread assigned to the port by periodically polling the thread done registers. If it receives 266 an indication through such polling that the receive processing thread to which the port is assigned has reported that it has completed processing for the port and is available for further processing tasks, the receive scheduler thread "unblocks the port" by removing 268 the port-to-block assignment from its list and returns to reassign the port to an available receive processing thread at 254. If the receive scheduler thread determines 264 that the port is no longer assigned to a receive processing thread, the receive scheduler thread assigns 256 the port to an available receive processing thread.

Additions, subtractions, and other modifications of the preferred embodiments of the invention will be apparent to those practiced in this field and are within the scope of the following claims.

What is claimed is:

1. A method comprising:
   scheduling processing of data received at a plurality of ports, the processing performed by a plurality of processing threads that execute in parallel, including
      determining that a first segment of data is available from one of the plurality of ports,
      selecting one of the plurality of processing threads that is available to process the first segment of data,
      assigning the port to the selected processing thread,
      processing the first segment of data using the assigned processing thread,
      determining that a second segment of data is available from the assigned port, and
      awaiting notification by the processing thread that processing of the first segment of data has been completed prior to unblocking the port and re-assigning the port to one of the plurality of processing threads.

2. The method of claim 1, further comprising:
   directing transfer of the data from the assigned port to the one of the plurality of processes for processing.

3. The method of claim 1, wherein selecting comprises: determining if any of the plurality of processes is available to process the data; and
   if it is determined that one of the plurality of processes is available to process the data, choosing an available one of the plurality of processes.

4. The method of claim 1, further comprising:
   recording the port-to-process assignment on an assignment list.

5. The method of claim 4, further comprising:
   removing the port-to-process assignment from the assignment list upon receiving notification that the processing has been completed.

6. The method of claim 1, wherein the data comprises packet data.

7. The method of claim 6, wherein the packet data comprises a network packet.

8. The method of claim 7, wherein the packet data comprises a predetermined portion of a network packet.

9. The method of claim 7, wherein the network packet comprises an Ethernet packet.

10. The method of claim 1, wherein the one of the plurality of ports comprises a 10/100 BaseT Ethernet port.

11. The method of claim 1, wherein the scheduling is performed by a scheduling thread that executes in parallel to the processing threads.

12. The method of claim 11, wherein the selecting is performed by the scheduling thread.

13. The method of claim 11, in which the scheduling thread comprises a hardware controlled thread.

14. The method of claim 1, wherein the first and second segments of data are portions of a single network packet, and the first and second segments of data are processed by different processing threads.

15. The method of claim 1, wherein selecting a processing thread that is available to process the first segment of data comprises polling registers to determine which processing threads have completed processing of data.

16. The method of claim 1, wherein the number of processing threads is larger than the number of ports.

17. The method of claim 1, wherein the processing threads comprise multiple hardware controlled threads executing in parallel.

18. A machine-accessible medium, which when accessed results in a machine performing operations comprising:
   scheduling processing of data received at a plurality of ports by a plurality of processing threads that execute in parallel, including
      determining that a first segment of data is available from one of the plurality of ports,
      selecting one of the plurality of processing threads that is available to process the first segment of data,
      assigning the port to the selected processing thread,
      processing the first segment of data using the assigned processing thread,
      determining that a second segment of data is available from the assigned port, and
      awaiting notification by the processing thread that processing of the first segment of data has been completed prior to unblocking the port and re-assigning the port to one of the plurality of processing threads.

19. The machine-accessible medium of claim 18, which when accessed, results in the machine performing operations comprising:
   using a scheduling thread to schedule the processing of data, the scheduling thread executing in parallel with the processing threads.

20. The machine-accessible medium of claim 19, wherein selecting one of the plurality of processing threads that is available to service the port comprises determining if any of the plurality of processes is available to process the data; and
choosing an available one of the plurality of processes if it is determined that one of the plurality of processes is available to process the data.

21. The machine-accessible medium of claim 18, which when accessed results in the machine performing operations comprising recording the port-to-process assignment on an assignment list.

22. The machine-accessible medium of claim 21, which when accessed results in the machine performing operations comprising removing the port-to-process assignment from the assignment list upon receiving notification that the processing has been completed.

23. A method comprising:
scheduling processing of network packet data received at a plurality of ports, the processing performed by a plurality of processing threads that execute in parallel, comprising:
using a scheduling thread that executes in parallel to the processing threads to select a processing thread that is available to process a first segment of data received at one of the plurality of ports,
assigning the port to the selected processing thread,
recording the port-to-process assignment on an assignment list,
determining that a second segment of data is available from the port, and
awaiting notification by the processing thread that processing of the first segment of data has been completed prior to unblocking the port, removing the port-to-process assignment from the assignment list, and re-assigning the port to one of the plurality of processing threads.

24. The method of claim 23, wherein the scheduling thread schedules the processing of network packet data so that segments of the network packet data received at a particular port are processed serially in a sequence that the segments are received at the port.

25. The method of claim 23, wherein the scheduling thread and the processing threads comprise multiple hardware controlled threads executing in parallel.

* * * * *